United States Patent [19]

Schlesinger

[11] Patent Number: 4,742,162
[45] Date of Patent: May 3, 1988

[54] AZO-STIBENE CONDENSATES AS LEATHER DYES

[75] Inventor: Ulrich Schlesinger, Binzen, Fed. Rep. of Germany

[73] Assignee: Ciba-Geigy Corporation, Ardsley, N.Y.

[21] Appl. No.: 597,212

[22] Filed: Apr. 6, 1984

Related U.S. Application Data

[63] Continuation of Ser. No. 376,334, May 10, 1982, abandoned.

[30] Foreign Application Priority Data

May 18, 1981 [CH] Switzerland ............... 3220/81

[51] Int. Cl.$^4$ ............ C09B 43/00; C09B 56/04; C09B 56/06; P06P 3/32
[52] U.S. Cl. ............ 534/689; 534/589; 534/678; 534/681
[58] Field of Search ............ 260/169, 174, 175; 534/689

[56] References Cited

U.S. PATENT DOCUMENTS

| | | | |
|---|---|---|---|
| 2,518,023 | 8/1950 | Keller et al. | 260/175 |
| 4,006,130 | 2/1977 | Ditzer | 260/173 |
| 4,141,889 | 2/1979 | Allan | 260/174 |
| 4,169,832 | 10/1979 | Wicki et al. | 260/169 |

FOREIGN PATENT DOCUMENTS

| | | | |
|---|---|---|---|
| 276907 | 1/1951 | Switzerland | 260/169 |
| 282347 | 1/1952 | Switzerland | 260/169 |
| 669706 | 9/1952 | United Kingdom | 260/169 |

Primary Examiner—Floyd D. Higel
Attorney, Agent, or Firm—Edward McC. Roberts; Meredith C. Findlay; Kevin T. Mansfield

[57] ABSTRACT

Condensates of an azo compound of the formula

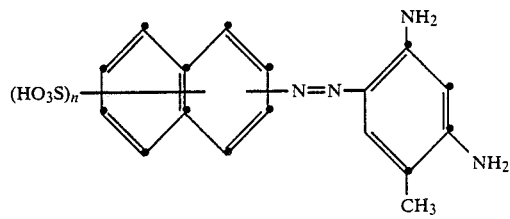

wherein n is 1 or 2, with the stilbene compound of the formula

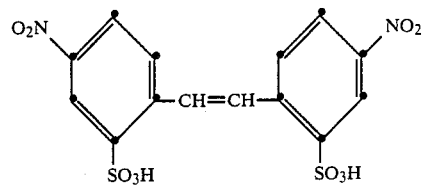

in the molar ratio of 1:1 to 2:1, dye leather in a yellowish-brown shade, which penetrate deeply into the leather, and give fast dyeings.

3 Claims, No Drawings

AZO-STIBENE CONDENSATES AS LEATHER DYES

This application is a continuation of application Ser. No. 376,334, filed May 10, 1982, now abandoned.

The present invention relates to azo-stilbene dyes, to their production and to their use for dyeing leather.

The novel dyes are obtained by condensing an azo compound of the formula I

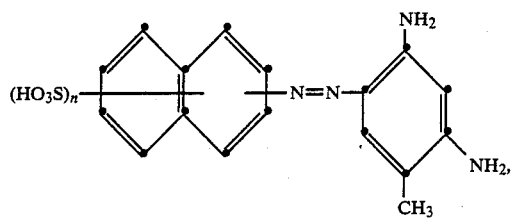

wherein n is 1 or 2, with the stilbene compound of the formula II

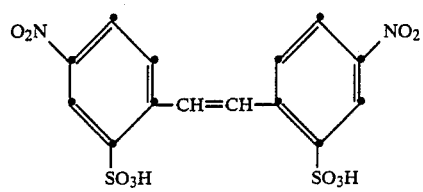

in the molar ratio of 1:1 to 2:1.

Azo-stilbene dyes similar to the dyes according to the present invention have been known for some considerable time. The Swiss Patent Specification No. 282,347 describes a process for producing dyeings on leather, in which process the leather is dyed with azo-stilbene dyes that are obtained by condensation of an aminoazo compound of the formula I, wherein R is hydrogen or methoxy, with a stilbene compound of the formula II given above. The dyes mentioned in the said patent specification are however not able to satisfy all needs in practice. There is provided for example no yellowish-brown which penetrates sufficiently deep into the leather.

It was the object of the present invention to provide yellowish-brown dyes having the necessary depth of penetration. This requirement has now been met by the dyes according to the invention. They have the desired yellowish-brown shade and are distinguished by good penetration into the leather, the dyeings obtained having good fastness properties, especially fastness to light, and fastness to diffusion with respect to soft PVC.

The azo dyes of the formula I given above and also the stilbene compound of the formula II are known and are obtained in a known manner. The azo compounds of the formula I are obtained for example by coupling the diazo compound of a sulfonated naphthylamine with 4-methyl-m-phenylenediamine.

Suitable naphthylamines are for example: 1-aminonaphthalene-2-, -3-, -4-, -5-, -6-, -7- or -8-sulfonic acid. 1-aminonaphthalene-3,6-, -4,6- or -4,7-disulfonic acid, 2-aminonaphthalene-5-, -6- or -8-sulfonic acid, as well as 2-aminoaphthalene-3,6-, -4,8- or -6,8-disulfonic acid. Preferred among these is 1-aminonaphthalene-5-sulfonic acid. It is also possible to use mixtures of these naphthylamines.

The condensation of the azo compound with the stilbene compound is performed in a manner known per se. It is advantageous to perform the condensation in an aqueous medium and in the presence of alkali hydroxide. Good results are obtained for example when azo compound and stilbene compound are reacted with one another in a dilute, preferably 2 to 8%, alkali hydroxide solution, for a longish period, for example 5 to 25 hours, at elevated temperature, preferably in an open vessel at the boiling temperature of the reaction mixture and with reflux cooling, or at a still higher temperature and under pressure. The azo compound and stilbene compound are used in molar ratios of 1:1 to 2:1, preferably in the ratio of 1:1.

The dyes according to the invention are suitable for dyeing leather, for example chrome leather, re-tanned leather or suède leather of goat, cow and pig.

The following Examples serve to further illustrate the invention without its scope being limited to them. The term 'parts' denotes parts by weight, percentages are percent by weight, and temperature values are given in degrees Centigrade.

EXAMPLE 1

35.6 parts (0.1 mol) of the monoazo dye, which is obtained by the coupling of diazotised 1-aminonaphthalene-5-sulfonic acid with 2,4-diaminotoluene in an acetic acid medium, are dissolved warm with 43.0 parts (0.1 mol) of 4,4'-dinitrostilbene-2,2'-disulfonic acid in 500 parts of water with the addition of 50 parts of 30% sodium hydroxide solution, and the solution is subsequently refluxed with stirring for 15 hours. To the reaction mixture obtained are added 50 parts of sodium chloride; and, by the addition of hydrochloric acid, the excess sodium hydroxide is then neutralised to the extent that brilliant yellow paper changes to a pale orange in colour. The condensation product has precipitated practically completely. After it has been filtered off and dried, it is in the form of a dark powder which dissolves in water to give a brown colour, and dyes chrome leather in yellowish-brown shades.

EXAMPLE 2

When the procedure is carried out as described in Example 1 except that the monoazo dye used therein is replaced by that produced by the coupling of diazotised 1-aminonaphthalene-4-sulfonic acid with 2,4-diaminotoluene, there is obtained a dye which dyes chrome leather in yellowish-brown shades.

EXAMPLE 3

When the procedure is carried out as described in Example 1 except that the monoazo dye used therein is replaced by that produced by the coupling of diazotised 1-aminoaphthalene-3,6-disulfonic acid with 2,4-diaminotoluene, there is obtained a dye which dyes chrome leather in yellowish-brown shades.

EXAMPLE 4

When the procedure is carried out as described in Example 1 except that 0.2 mol of the monoazo dye used therein is reacted with 0.1 mol of 4,4'-dinitrostilbene-2,2'-disulfonic acid, there is obtained a dye which dyes chrome leather in yellowish-brown shades.

EXAMPLE 5

100 parts of a chrome-tanned bull's hide not intermediately dried and having a shaved thickness of 1.1 mm are pretreated in 300 parts of water, in the presence of 0.3 part of a sequestering agent (ethylenediaminetetraacetate), for 15 minutes at 30°. This is followed by re-tanning for 90 minutes with 5 parts of a chromium-containing synthetic tanning agent in 100 parts of water at 50°. The material is subsequently washed for 10 minutes in 500 parts of water at 30°.

The re-tanned leather is then neutralised at 30° in a solution of 300 parts of water and 1.5 parts of sodium formiate for 10 minutes, and, after the addition of 2.5 parts of sodium bicarbonate, for a further 80 minutes. The leather is afterwards washed for 5 minutes in 500 parts of water at 40°.

The furniture leather, re-tanned and neutralised in the described manner, is subsequently pretreated for 20 minutes at 30° in a liquor prepared from 100 parts of water, 2 parts of 24% ammonia and 3 parts of a levelling agent (mixture of a sulfonated sulfone mixture of phenol and crude cresol with glue). There are then added 1.32 parts of the dye from Example 1. After a dyeing time of 30 minutes, a fat-liquoring mixture, consisting of 4 parts of a synthetic fat-liquoring agent and 2 parts of sulfonated fish oil, it also added, and dyeing is continued until full penetration of the dye has occurred, which is the case after 60 minutes. The liquor is then diluted with 200 parts of water at 70°, and after 15 minutes it is acidified (pH 4.0) with 1.5 parts of 85% formic acid, mixed with 15 parts of water, and treatment proceeds for a further 30 minutes. The leather is afterwards rinsed and finished in the usual manner.

The furniture leather, dyed evenly throughout, has a yellowish-brown shade.

What is claimed is:

1. An azo-stilbene dye which is a condensate of an azo compound of the formula

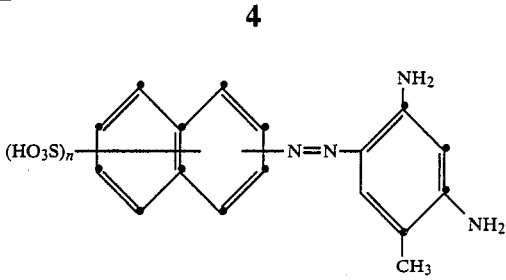

wherein n is 1 or 2, and the stilbene compound of the formula

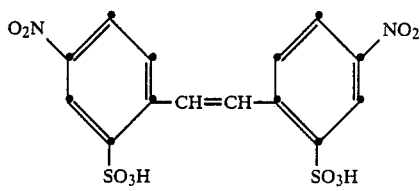

in the molar ratio of 1:1.

2. A dye of claim 1, wherein n is 1.

3. The dye of claim 2 wherein the azo compound is of the formula

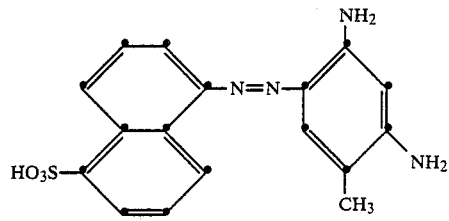

and the molar ratio is 1:1.

* * * * *